United States Patent [19]

Enright et al.

[11] 4,230,253
[45] Oct. 28, 1980

[54] METHOD OF MAKING A CALIPER BRAKE ROTOR

[75] Inventors: John J. Enright, Troy; William T. Holzworth, Springfield, both of Ohio

[73] Assignee: The B. F. Goodrich Company, Akron, Ohio

[21] Appl. No.: 89,843

[22] Filed: Oct. 31, 1979

Related U.S. Application Data

[62] Division of Ser. No. 950,491, Oct. 11, 1978.

[51] Int. Cl.³ ............................................. B23K 31/02
[52] U.S. Cl. .................................... 228/152; 228/182
[58] Field of Search ............ 188/218 XL; 192/107 M; 228/152, 182

[56] References Cited

U.S. PATENT DOCUMENTS

| 2,146,823 | 2/1939 | Karmazin | 228/182 X |
| 3,610,873 | 10/1971 | Vansteenkiste | 228/182 X |

Primary Examiner—Duane A. Reger
Attorney, Agent, or Firm—Harry F. Pepper, Jr.

[57] ABSTRACT

A method for making a rotor for a caliper brake with a disc mounted on a cylindrical adaptor. The disc includes a coiled metal strip having a rectangular cross section with edge surfaces aligned to provide friction faces for engagement by friction lining carriers of the brake while decreasing the vibration and noise during braking. The ends of the coiled strip are welded to the disc and the overlapping surfaces of the coils are brazed together.

4 Claims, 6 Drawing Figures

METHOD OF MAKING A CALIPER BRAKE ROTOR

This is a division, of application Ser. No. 950,491, filed Oct. 11, 1978.

BACKGROUND OF THE INVENTION

This invention relates to caliper type brakes or clutches and particularly to caliper type brakes having rotors for engagement by brake shoes on opposite sides of the rotors. In caliper brakes used heretofore, the rotors have been cut out of plate steel and the contact of the brake shoes with the discs has generated undesirable noise. The manufacture of these discs has also been costly because it has been impossible to cut the round discs out of plate steel without generating substantial scrap.

Friction discs of carbon for aircraft disc type brakes have been made by winding layers of chopped fibers and resin in helical configurations and then sintering the material into a unitary structure. Also helically wound layers of fibrous base material and asbestos web material have been proposed as clutch facings. In none of these friction members have provisions been made for controlling noise. These friction members made by helical winding of material other than metal have not been proposed for caliper brakes but only for purposes where the frictional engagement is in a continuous 360-degree area around the discs. In caliper brakes, the rotor is mounted for rotation with a wheel and is engaged by friction linings at circumferentially spaced-apart positions with the noise being generated at the localized area where each of the linings engages the disc surface.

SUMMARY OF THE INVENTION

According to this invention, a rotor for a caliper brake is made by coiling a strip of steel into a disc shape with a central opening. The coils are held together so that the inner and outer peripheries may be machined; however, the radial discontinuity between adjacent coils acts as a barrier to the transmission of friction lining induced vibrations from one coil to the next. This barrier acts to decrease the disc vibrations and noise by dampening and detuning the vibration between adjacent coils which is excited by the same brake friction lining carrier.

In the manufacture of the rotor, the coils may be held together by furnace brazing in an oven. The heat required to braze the adjacent coils together also heat-treats the rotor and residual stresses resulting from the coiling operation are relieved. This heat treatment also reduces the incidence of "heat checking" or generation of small surface cracks due to thermal stresses.

The accompanying drawings show a preferred form and one modification of the rotor made in accordance with and embodying this invention and which is representative of how this invention may be practiced.

BRIEF DESCRIPTION OF THE DRAWINGS

In the drawings:

FIG. 4 is an enlarged partial section of the rotor of FIG. 3 taken along the plane of line 4—4 before brazing in the oven.

DETAILED DESCRIPTION

Figure 1:
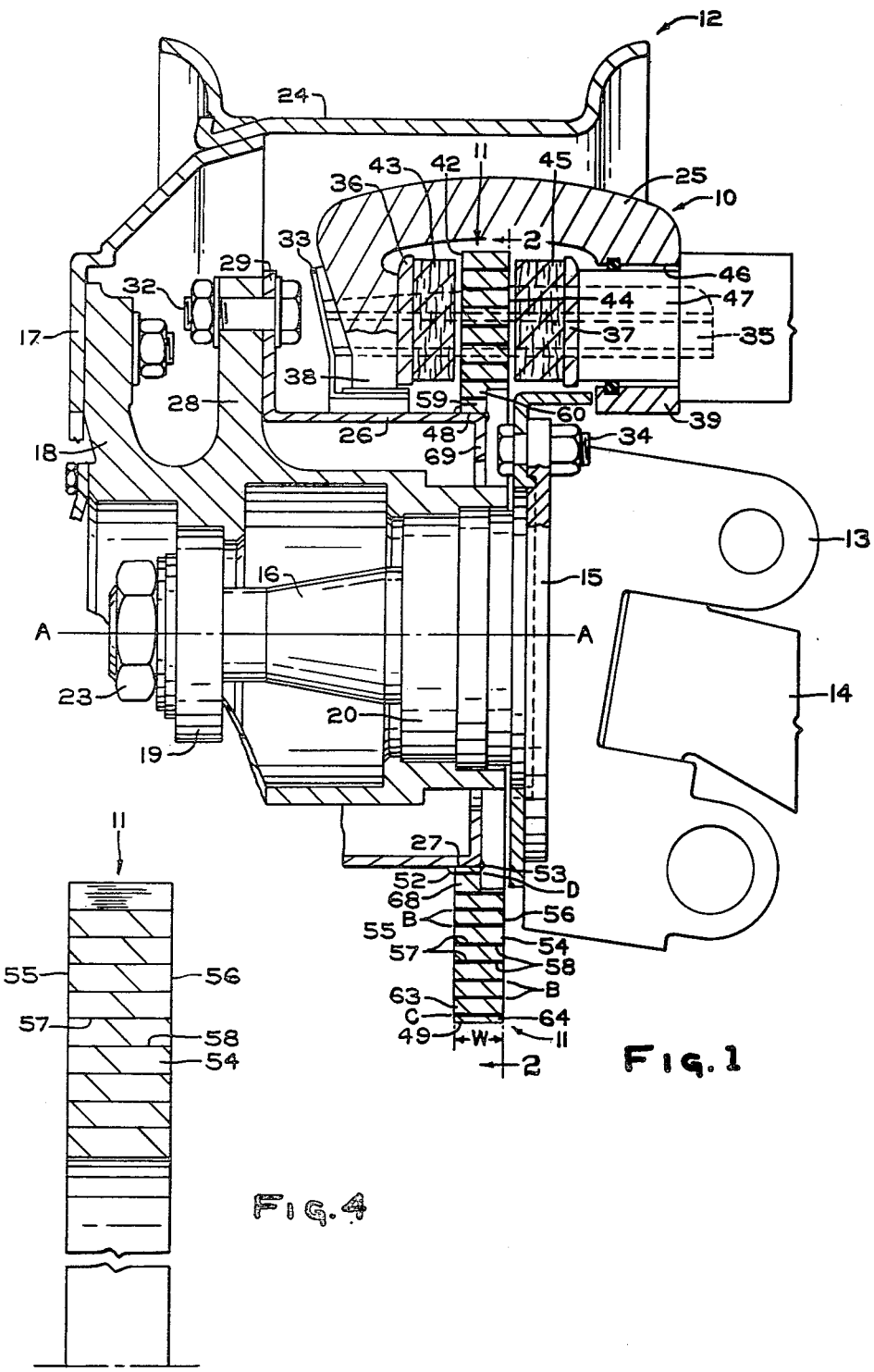
FIG. 1 is a fragmentary sectional view of a caliper brake and wheel assembly mounted on the front axle of a vehicle showing a rotor made in accordance with the invention.

Referring to FIG. 1, a caliper brake 10 is shown which has a rotor or disc 11 embodying the invention. The caliper brake 10 is mounted on a wheel and axle assembly 12 for a front end of a vehicle. A clevis bracket 13 is pivotally mounted on a front axle 14 and fastened to a circular plate 15 which is intergral with a stub shaft 16 having an axis A—A. A wheel 17 having a hub 18 is rotatably mounted on the stub shaft 16 through suitable bearings 19 and 20 and retained on the stub shaft by a nut 23 threaded on the end of the shaft. The wheel 17 may have a rim 24 for supporting a tire (not shown).

The caliper brake 10 is mounted in the wheel well envelope within the wheel 17 and includes a caliper member 25 extending axially of the stub shaft 16 over the brake disc 11 which is connected to a cylindrical disc adaptor 26 at a central opening 27 of the disc. The hub 18 has a radially extending hub flange 28 to which an adaptor flange 29 of the disc adaptor 26 is fastened as by bolt and nut assemblies 32 positioned at circumferentially spaced-apart locations around the hub flange and adaptor flange. A torque plate 33 is bolted to the circular plate 15 by bolt and nut assemblies 34 at circumferentially spaced-apart positions around the circular plate. The torque plate 33 carries rail members 35 for slidably supporting the caliper member 25 and friction lining carriers 36 and 37.

At the outboard end of the caliper member 25, a radially extending member such as a rear leg 38 extends radially inward in overlapping relationship with the brake disc 11. At the inboard end of the caliper member 25, a radially extending member such as front leg 39 extends radially inward in overlapping relationship with the brake disc 11. Interposed between an outboard face 42 of the disc 11 and the rear leg 38 is the friction lining carrier 36 carrying a friction lining 43 for engagement with the outboard face of the disc. Interposed between an inboard face 44 of the disc 11 and the front leg 39 is the friction lining carrier 37 carrying a friction lining 45 for engagement with the inboard face of the disc.

The front leg 39 of the caliper member 25 includes a cylindrical opening 46 in which a brake actuating mechanism 47 may be mounted. The mechanism 47 may include an actuating screw and threaded connection to a shaft which is turned by an arm pivotally connected to a piston rod of a pneumatic piston and cylinder assembly (not shown).

The front leg 39 and rear leg 38 of the caliper member 25 may have axially extending grooves at the sides for sliding engagement with the rail members 35. Likewise, the friction lining carriers 36 and 37 have axially extending grooves at the edges for sliding engagement with the rail members 35. Accordingly, upon actuation of the brake 10 by movement of the actuating mechanism 47, the friction lining carrier 37 and friction lining 45 are moved to the left, as shown in FIG. 1, into braking engagement with the inboard face 44 of the disc 11.

At the same time the force exerted on the front leg 39 is transmitted through the beam of the caliper member 25 to the rear leg 38. The force from the rear leg 38 is transmitted to the lining carrier 36 urging the friction lining 43 into engagement with the outboard face 42 of the disc 11. This movement of the caliper member 25 is to the right, as shown in FIG. 1, away from the hub flange 28. In a similar manner, the caliper member 25 moves away from the hub flange 28 as the friction linings 43 and 45 wear and adjustment is made for this wear.

Figure 2:
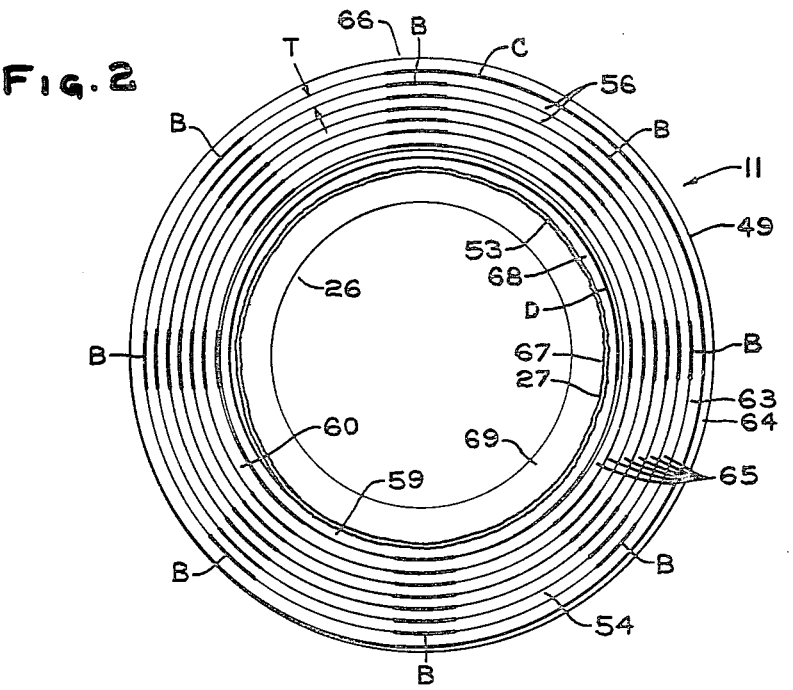
FIG. 2 is an elevation on a reduced scale of the rotor and adaptor taken along the plane of line 2—2 in FIG. 1.

Referring now to FIG. 2, the central opening 27 of the disc 11 and an outer periphery 49 of the disc are generally cylindrical with the central opening positioned around the disc adaptor 26 and fastened thereto by welds 52 and 53. The disc 11 has a coiled strip 54 of metal such as steel with a generally rectangular cross section. Edge surfaces 55 and 56 on each side of the disc 11 are aligned to provide the outboard face 42 and inboard face 44 of the disc. Between the coils are overlapping surfaces 57 and 58 of the coiled strip 54 which may be adhered or otherwise held in an abutting relationship.

Adjacent the central opening 27 are radially inner coils 59 and 60 with the overlapping surfaces 57 and 58 adhered as by furnace brazing. Adjacent the outer periphery 49 are radially outer coils 63 and 64 having overlapping surfaces 57 and 58 adhered together as by furnace brazing. Between the inner coils 59 and 60 and the outer coils 63 and 64 are positioned intermediate coils 65 having overlapping surfaces 57 and 58 which are adhered by furnace brazing at circumferentially spaced-apart positions indicated by the letter B and heavy lines in FIG. 2 for the preferred construction.

The inner coils 59 and 60 have overlapping surfaces 57 and 58 which are adhered together over a circumferentially continuous arc of at least 360 degrees indicated by a heavy line in FIG. 2 and by the letter C. The outer coils 63 and 64 have operlapping surfaces 57 and 58 which are adhered over an arc of at least 360 degrees and shown in heavy lines in FIG. 2 designated by the letter D. The brazing between the intermediate coils, indicated by letter B, is spaced at angles of around 45 degrees circumferentially of the disc 11.

It is possible to employ other means to hold or join the coils of disc 11 in proper overlapping position. For example, rather than using furnace brazing at circumferentially spaced positions B, radially extending pins could be made to extend along these circumferentially spaced positions. The presence of such pins would maintain the alignment of the coil edges and would have the further advantage of achieving complete discontinuity between adjacent coils. When other means, such as pins, are used to hold the coils in position, it may be desirable to still use brazing to adhere inner coils 59 and 60 and outer coils 63 and 64 over 360 degree arcs as shown by heavy lines C and D respectively.

In the preferred embodiment, the coiled strip 54 has a thickness T of around ⅜ inch (0.95 centimeters) and a width W of around 1-5/16 inch (3.3 centimeters). Preferably the edge surfaces 55 have a thickness T equal to at least 15 percent of the width W of the strip 54 and the strip thickness T is at least ¼ inch (0.64 centimeters). As shown in FIG. 2, the outer coil 64 has an end 66 which is tapered to provide a cylindrical outer periphery 49.

The inner coil 54 has an end 67 which is tapered to provide a cylindrical central opening 27 with a diameter of 9 inches (22.86 centimeters). The inner coils 59 and 60 may have a reduced width W which is less than the width of the intermediate coils 65 to provide a flange 68 for alignment with the adaptor disc flange 69 in the installed position. As shown in FIG. 2, the inner coils 59 and 60 extend over 720 degrees as do the outer coils 63 and 64 so that they may be adhered together.

In operation, the friction linings 43 and 45 on the friction lining carriers 36 and 37 are urged into braking engagement with the outboard and inboard faces 42 and 44 of the disc 11 which generates noise through vibrations at the friction lining carriers. With the coiled construction, there is a radial discontinuity between adjacent coils which acts as a barrier to the transmission of vibrations from one coil to the next. This barrier decreases the disc vibration and noise by dampening and detuning vibrations between adjacent coils excited by the same friction linings 43 and 45 on friction lining carriers 36 and 37.

Figure 3:
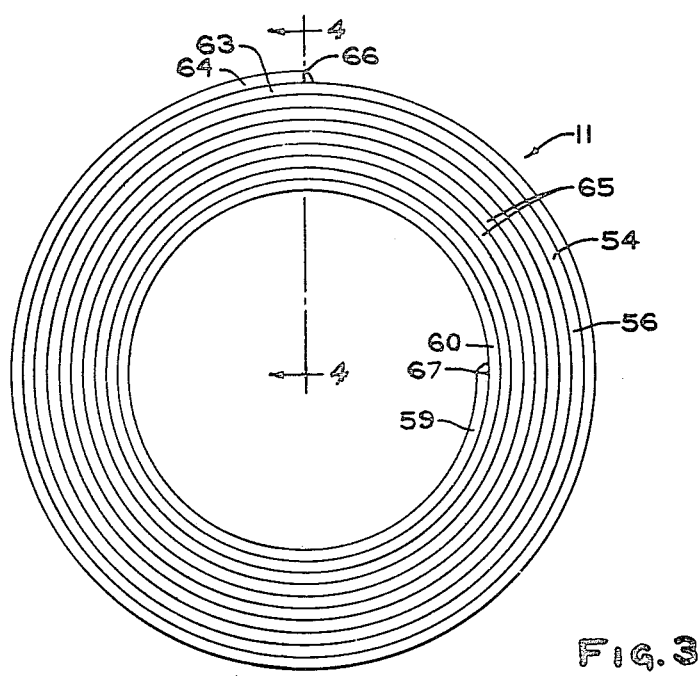
FIG. 3 is an elevation like FIG. 2 of the rotor after it is coiled and the ends tacked in place.
Figure 5:
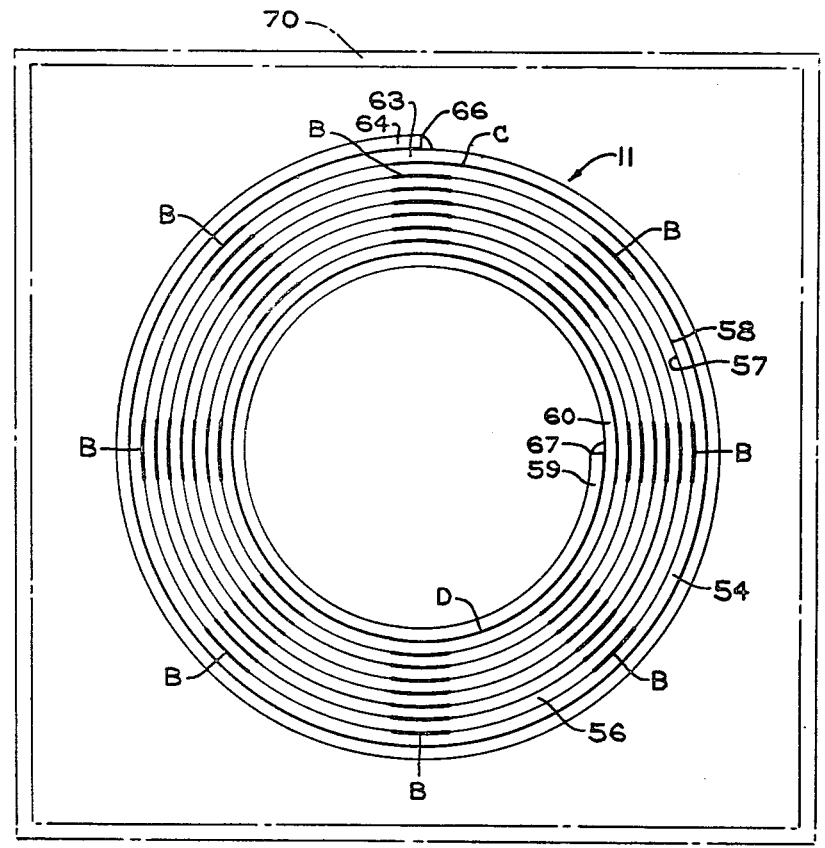
FIG. 5 is an elevation like FIG. 3 showing the rotor in the oven which is illustrated schematically and showing the brazed attachment of the coils in heavy lines.

Referring to FIG. 3, a first step in making the disc 11 is shown in which the strip 54 is coiled and the end 66 of the outer coil 64 is welded to the other outer coil 63. Also the end 67 of the inner coil 59 is welded to the other inner coil 60 to hold the coiled strip in position. The disc 11 is then placed in an oven 70, shown schematically in chain-dotted lines in FIG. 5, where it is furnace brazed as shown in dark lines at positions B, C and D described hereinabove with respect to FIG. 2. The oven 70 is heated to a temperature for furnace brazing of around 2,050° F. (1,121° Celsius) and then cooled at room temperature. During this process, the residual stresses resulting from the coiling of the strip 54 are relieved and the resistance of the outboard and inboard faces 42 and 44 of the disc 11 to heat checking or generation of small surface cracks due to thermal stresses during the braking operation is substantially increased. After the disc 11 is removed from the oven 70, it is machined at the central opening 27 in a cylindrical configuration and at the outer periphery 49 in a cylindrical configuration. Also the inner coils 59 and 60 are machined to reduce the width W and provide the disc flange 68 for fastening to the flange 69 of the adaptor 26.

Figure 6:
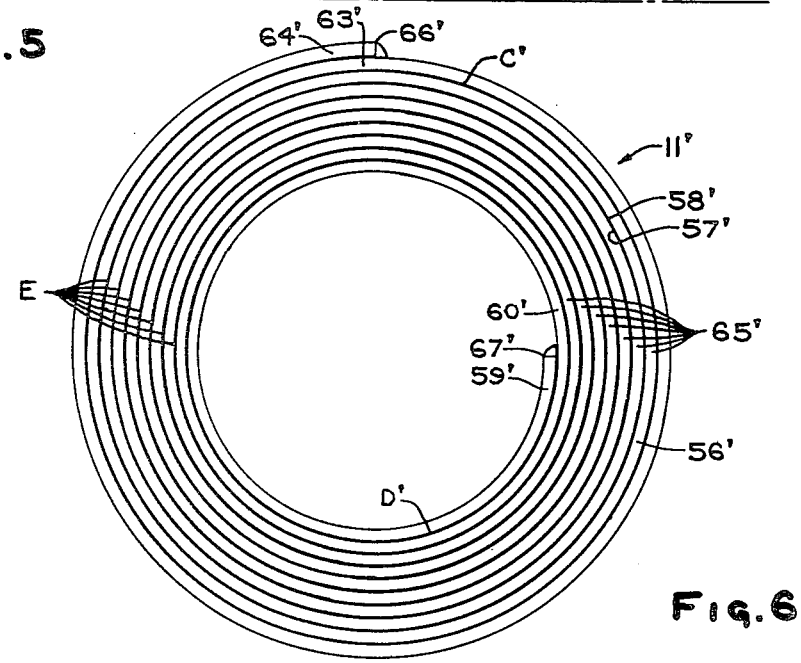
FIG. 6 is an elevation like FIG. 5 of a rotor modification showing another form of brazed attachment of the coils in heavy lines.

Referring to FIG. 6, a modification is shown in which the intermediate coils 65' have overlapping surfaces 57' and 58' which are adhered by furnace brazing over substantially all the overlapping surfaces as shown by the heavy lines indicated by letter E. The disc 11' is furnace brazed and then machined in the same way as described above for disc 11. In operation, the coiled construction provides the desired noise reduction for similar reasons as those set forth above for disc 11.

The invention is capable of other modifications and adaptations by those having ordinary skill in the art and is more particularly defined by the appended claims.

We claim:

1. A method of making a rotor for a caliper brake comprising:
    (1) wrapping an elongated steel strip in a coil to form a disc with a central opening and an outer periphery;
    (2) welding the ends of said strip to said disc;
    (3) adhering the overlapping surfaces of said coils together;
    (4) machining the outer periphery and central opening to taper the ends of said strips and provide a uniform diameter of said central opening and of said outer periphery of the rotor; and (5) welding said disc to a cylindrical adaptor for fastening said rotor to a wheel.

2. A method of making a rotor according to claim 1 wherein said step (3) includes placing said disc in an oven and furnace brazing the disc at a relatively high temperature and then cooling said disc at room temperature to relieve residual stresses in the disc.

3. A method of making a rotor according to claim 2 wherein the disc is heated to a temperature of around 2,050° F. (1,121° Celsius) until the copper alloy used for brazing is melted.

4. A method of making a rotor according to claim 1 wherein said step (4) includes reducing the width of coils adjacent said central opening to provide a flange for attachment to said cylindrical adaptor.

* * * * *